United States Patent
Liu et al.

(10) Patent No.: US 7,490,962 B2
(45) Date of Patent: Feb. 17, 2009

(54) LIGHT EMITTING MODULE AND SURFACE LIGHT SOURCE DEVICE

(75) Inventors: Ming-Dah Liu, Miao-Li County (TW); Tzeng-Ke Shiau, Miao-Li County (TW); Wen-Bin Chou, Miao-Li County (TW); Teng-Chao Hou, Miao-Li County (TW)

(73) Assignee: Coretronic Corporation, Hsin-Chu (TW)

( * ) Notice: Subject to any disclaimer, the term of this patent is extended or adjusted under 35 U.S.C. 154(b) by 110 days.

(21) Appl. No.: 11/552,991

(22) Filed: Oct. 26, 2006

(65) Prior Publication Data

US 2007/0145395 A1    Jun. 28, 2007

(30) Foreign Application Priority Data

Dec. 23, 2005    (TW) .............................. 94146078 A

(51) Int. Cl.
*F21V 7/04* (2006.01)

(52) U.S. Cl. ..................... 362/307; 362/609; 362/615; 362/623

(58) Field of Classification Search ................. 362/307, 362/311, 308, 309, 330, 608, 609, 610, 612, 362/613, 615, 616, 619, 620, 623, 625, 626, 362/628
See application file for complete search history.

(56) References Cited

U.S. PATENT DOCUMENTS

| 6,598,998 B2 | 7/2003 | West et al. |
| 7,172,324 B2 * | 2/2007 | Wu et al. ..................... 362/559 |
| 2005/0286251 A1 | 12/2005 | Smith |

FOREIGN PATENT DOCUMENTS

| JP | 11-133426 | 5/1999 |
| JP | 2005-183124 | 7/2005 |

* cited by examiner

*Primary Examiner*—Bao Q Truong
(74) *Attorney, Agent, or Firm*—Jianq Chyun IP Office

(57) ABSTRACT

A light emitting module including a light source set and a light guide member is provided. The light source set is suitable for providing a light and the light guide member is disposed above the light source set. The light guide member has a top surface, an opposite light incident surface, a first reflection surface, and an opposite light emergent surface connected between the top surface and the light incident surface. The top surface has a first concave surface serving a second reflection surface suitable for reflecting the light. Besides, a portion of the light reflected by the second reflection surface emerges from the light emergent surface through the reflection of the first reflection surface, and the other portion of the light directly emerges from the light emergent surface. Additionally, a surface light source device having the light emitting module is also provided.

16 Claims, 4 Drawing Sheets

LIGHT EMITTING MODULE AND SURFACE LIGHT SOURCE DEVICE

CROSS-REFERENCE TO RELATED APPLICATION

This application claims the priority benefit of Taiwan application serial no. 94146078, filed Dec. 23, 2005. All disclosure of the Taiwan application is incorporated herein by reference.

BACKGROUND OF THE INVENTION

1. Field of the Invention

The present invention generally relates to a light emitting module, and more particularly, to a light emitting module using light emitting diodes (LEDs) as a light source and a surface light source device in which the light emitting module is applied to.

2. Description of Related Art

Recently, with an increased in the light emitting efficiency of the LED, the LED has gradually replaced the fluorescent lamp and the incandescent lamp in some fields, such as the backlight module of the liquid crystal display (LCD).

FIGS. 1A and 1B are schematic diagrams showing a side emitting light emitting devices disclosed in the U.S. Pat. No. 6,598,998. The conventional light emitting module 100 comprises a light guide member 110 and a plurality of side emitting light emitting diode (LED) package structures 120. The light guide member 110 has a plurality of through holes 112, and the LED package structures 120 are embedded in the through holes 112. Besides, each LED package structure 120 comprises a carrier 122, an LED chip 124 and a lens part 126. The LED chip 124 is arranged on the carrier 122, and the lens part 126 encloses the LED chip 124.

According to the above description, the LED chip 124 is suitable for emitting a light, and the lens part 126 has a reflection surface 126a and a plurality of refraction surfaces 126b. The light emitted from the LED chip 124 is reflected by the reflection surface 126a and refracted by the refraction surface 126b, and then the light emerges from a side of the lens part 126 and is incident into the light guide member 110 (such as a light beam 50). Next, the light beam 50 undergoes total internal reflection many times within the light guide member 110 and then uniformly emerges a light emergent surface (not shown herein) of the light guide member 110.

In the conventional light emitting module 100, the propagation direction of the light beam 50 is not well guided, and the light beam 50 undergoes total internal reflection many times within the light guide member 110, such that the light emitting efficiency is lowered. Besides, the LED package structure 120 of single side light emitting only emits a light beam with a single wavelength, and there is a need to combine different LED package structures 120 of different wavelengths to generate white light. However, this would increase the cost and requires a larger space for mixture of the light, and therefore the volume of the conventional light emitting module 100 is larger. Additionally, the cost of the LED package structure 120 of side emitting is higher to result in a higher fabrication cost of the light emitting module 100.

SUMMARY OF THE INVENTION

Accordingly, an object of the present invention is directed to a light emitting module having a higher light emitting efficiency.

Another object of the present invention is to provide a surface light source device adapted for providing a surface light source with higher light intensity.

As embodied and broadly described herein, the present invention provides a light emitting module comprising a light source set and a light guide member. The light source set is suitable for providing a light beam, and the light guide member is disposed above the light source set. The light guide member has a top surface, a light incident surface corresponding to the top surface, a first reflection surface, and a light emergent surface corresponding to the first reflection surface. The first reflection surface and the light emergent surface are connected between the top surface and the light incident surface, respectively. The top surface has a first concave surface having a second reflection surface suitable for reflecting the light beam. Besides, a portion of the light beam reflected by the second reflection surface and the first reflection surface emerges from the light emergent surface, and the other portion of the light beam directly emerges from the light emergent surface.

According to another embodiment of the present invention, the present invention also provides a surface light source device comprising a light guide plate and a plurality of light emitting modules. The light emitting modules are disposed beside the light guide plate, and the light beam emerges the light emergent surface of the light guide member of each light emitting module is incident into the light guide plate.

According to the light emitting module of the present invention, a portion of the light beam provided by the light source set is reflected by the second reflection surface to be reflected to the light emergent surface directly, and the other portion of the light beam is reflected to the first reflection surface and reflected by the first reflection surface, and then the light beam is emerged from the light emitting surface. Since the light guide member has a better light guide effect, which reduces the occurrence of total internal reflections within the light guide member, the light emitting efficiency is improved, such that the surface light source device having the light emitting modules provide a surface light source with higher intensity.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
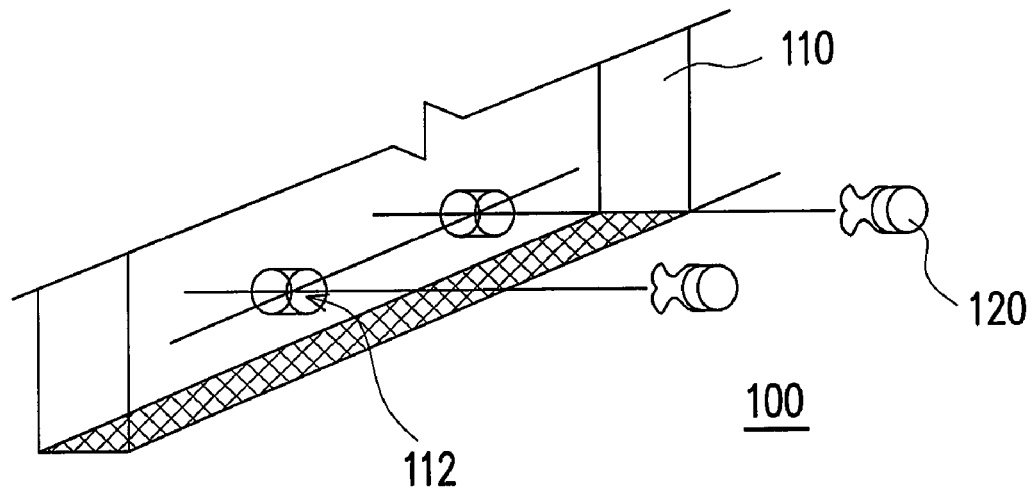
FIGS. 1A and 1B are schematic diagrams showing a side emitting light emitting devices disclosed in the U.S. Pat. No. 6,598,998.
Figure 1B:
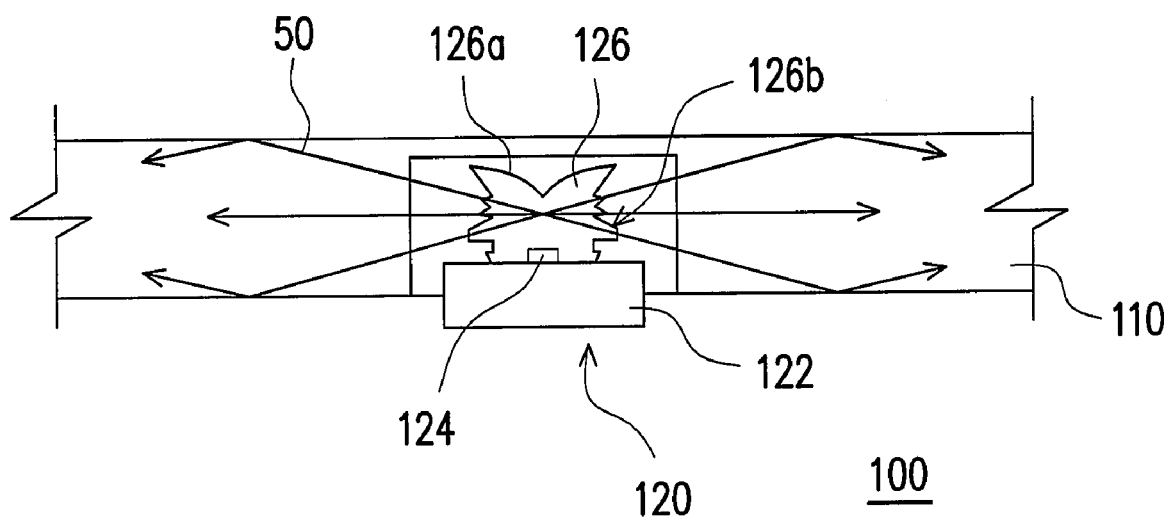

Reference will now be made in detail to the present preferred embodiments of the invention, examples of which are illustrated in the accompanying drawings. Wherever possible, the same reference numbers are used in the drawings and the description to refer to the same or like parts.

Figure 2:
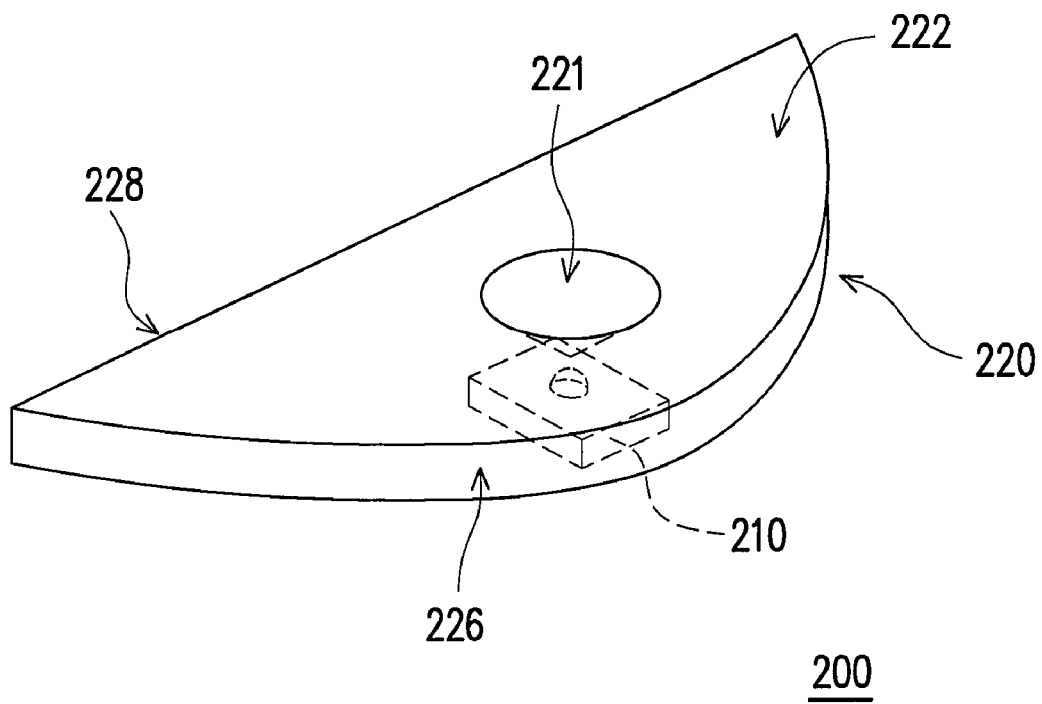
FIG. 2 is a perspective view of a light emitting module according to a first embodiment of the present invention.
Figure 3A:
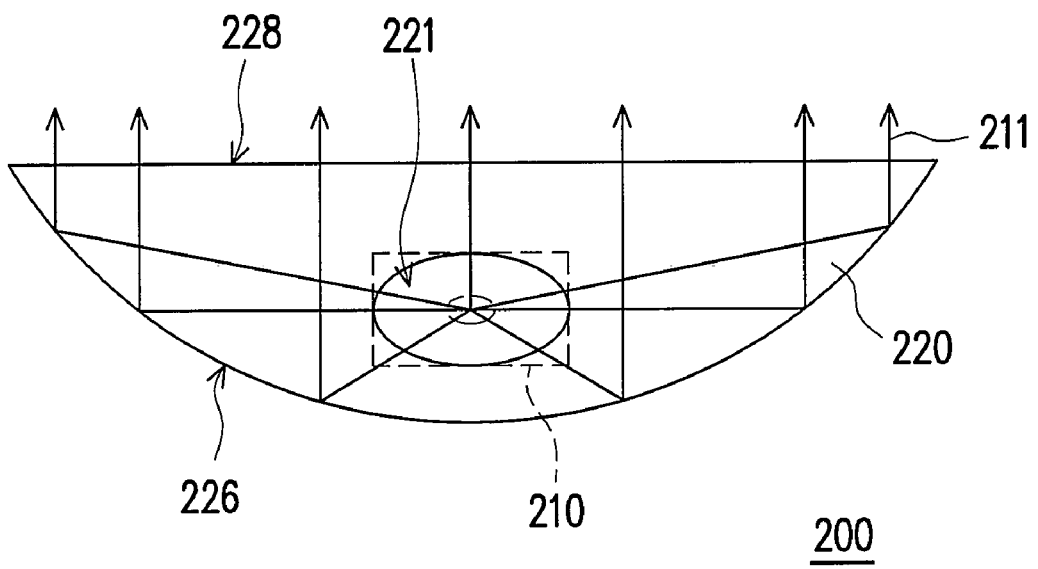
FIG. 3A is a top view of the light emitting module in FIG. 2.
Figure 3B:
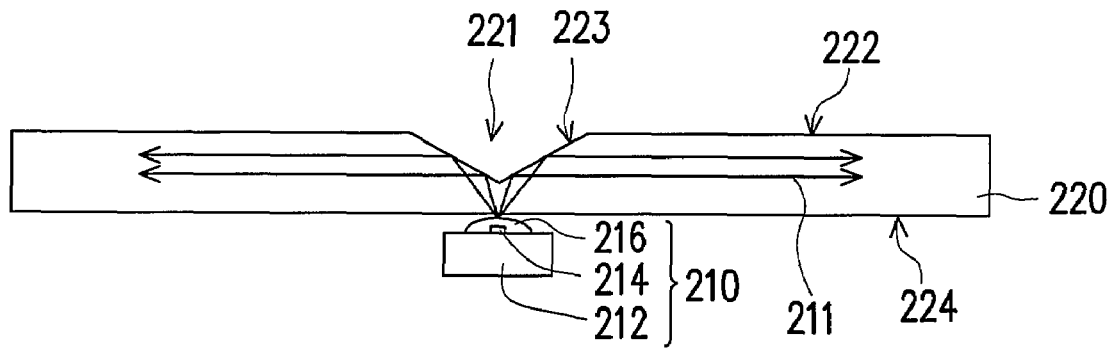
FIG. 3B is a schematic cross-sectional view showing the light emitting module in FIG. 2.

FIG. 2 is a perspective view diagram of a light emitting module according to a first embodiment of the present invention. FIG. 3A is a top view of the light emitting module in FIG. 2. FIG. 3B is a schematic cross-sectional view showing the light emitting module in FIG. 2. Referring to FIGS. 2, 3A and 3B, the light emitting module 200 according to the first embodiment of the present invention comprises a light source set 210 and a light guide member 220. The light source set 210 is suitable for providing a light beam 211; the light guide member 220 is disposed above the light source set 210. The light guide member 220 has a top surface 222, a light incident surface 224 corresponding to the top surface 222, a first reflection surface 226, and a light emergent surface 228 corresponding to the first reflection surface 226. The first reflection surface 226 and the light emergent surface 228 are connected between the top surface 222 and the light incident surface 224, respectively. Both ends of the first reflection surface 226 are connected to both ends of the light emergent surface 228. The top surface 222 has a first concave surface 221 having a second reflection surface 223 that is suitable for reflecting the light beam 211.

In the above-mentioned light emitting module 200, the light source set 210 comprises a carrier 212, at least one LED chip 214 and an encapsulant 216. The LED chip 214 is disposed on the carrier 212 and is suitable for providing the light beam 211. The encapsulant 216 encloses the LED chip 214. It should be noted that the light source set 210 comprises a plurality of the LED chips 214.

According to the above description, the light beam 211 emitted from the LED chip 214 is incident into the light guide member 220 through the light incident surface 224, and then the light beam 211 is reflected by the second reflection surface 223. Next, a portion of the light beam 211 reflected by the second reflection surface 223 is reflected to the first reflection surface 226 to be reflected by the first reflection surface 226 and then emerges from the light emergent surface 228. The other portion of the light beam 211 directly emerges the light emergent surface 228.

In this embodiment, the first concave surface 221 is a tapered concave surface, after the light beam 211 emitted from the light source set 210 is reflected by the second reflection surface 223, a portion of the light beam 211 transmits along a direction substantially parallel to the light incident surface 224 to emerge from the light emergent surface 228 and reduce the occurrence of total internal reflection between the top surface 222 and the light incident surface 224. The other portion of the light beam 211 transmits to the first reflection surface 226 to be reflected by the first reflection surface 226 along a direction substantially parallel perpendicular to the light emergent surface 228 of the light guide member 220' and then emerges from the light emergent surface 228 without total internal reflections. In a preferred embodiment, the light beam 211 undergoes total internal reflection once from the second reflection surface 223, and then the propagation direction of the light beam 211 is turned into a horizontal direction. When the light beam 211 arrives at the first reflection surface 226, the reflected light beam 211 continues to transmit horizontally but perpendicular to the light emergent surface 228 of the light guide member 220 and finally emerges from the light emergent surface 228.

The first reflection surface 226 and the second reflection surface 223 are paraboloids or other shaped surfaces having similar functions such as a ball-shaped surface, a surface composed of many inclined planes or other combinations of line segments and shapes having the same functions. The light emergent surface 228 of the light guide member 200 can be a curved surface except a plane according to the requirement.

In this embodiment, a reflection film (not shown) is formed on the first concave surface and/or the first reflection surface 226 of the light guide member 220 to protect a part of the light beam 211 from transmitting through the second reflection surface 223 and/or emerging from the first reflection surface 226. Further, many micro structures (not shown) for scattering the light beam 211 are formed on the first reflection surface 226 and/or the light emergent surface 228 to make the intensity distribution of the light beam 211 emitted from the light emergent surface 228 more even. The micro structures can be small protrusions, balls, rhombuses, polygons and so on.

According to the above description, the light beam 211 is well guided by the light guide member 220 to reduce the occurrence of total internal reflections within the light guide member 220 and make the light beam 211 emerged from the light emergent surface 228 have higher intensity, thus enhancing the light emitting efficiency of the light emitting module 200. Additionally, compared with the prior art using the conventional side emitting LED package structure, this embodiment employs a low-cost Lambertian LED package structure as the light source set 210, thus reducing the fabrication cost of the light emitting module 200. Furthermore, since a plurality of LED chips 214 is disposed on the carrier 212 of a single light source set 210, the light beams 211 emerged from these LED chips 214 are mixed within the encapsulant 216 and the light guide member 220, an additional space for mixing the light beam 211 is not required, thus reducing the volume of the light emitting module 200.

Second Embodiment

Figure 4:
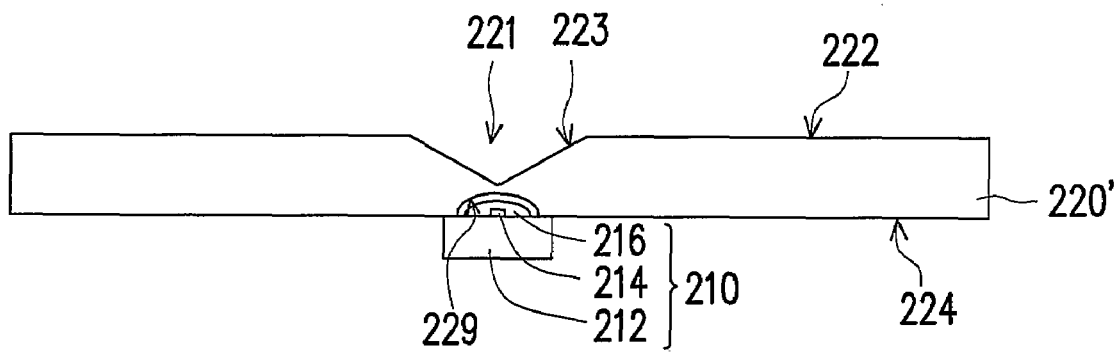
FIG. 4 is a schematic cross-sectional view showing a light emitting module according to a second embodiment of the present invention.

FIG. 4 is a schematic cross-sectional view showing a light emitting module according to a second embodiment of the present invention. Referring to FIGS. 3B and 4, the light emitting module 200' of the second embodiment is similar to the above-mentioned light emitting module 200 except that the light incident surface 224 of the light guide member 220' of the light emitting module 200' has a second concave surface 229 opposite to the first concave surface 221. The light source set 210 is embedded in the second concave surface 229 to make the alignment of the light source set 210 and the light guide member 220' be easier and further reduce the assembly time.

Third Embodiment

Figure 5:
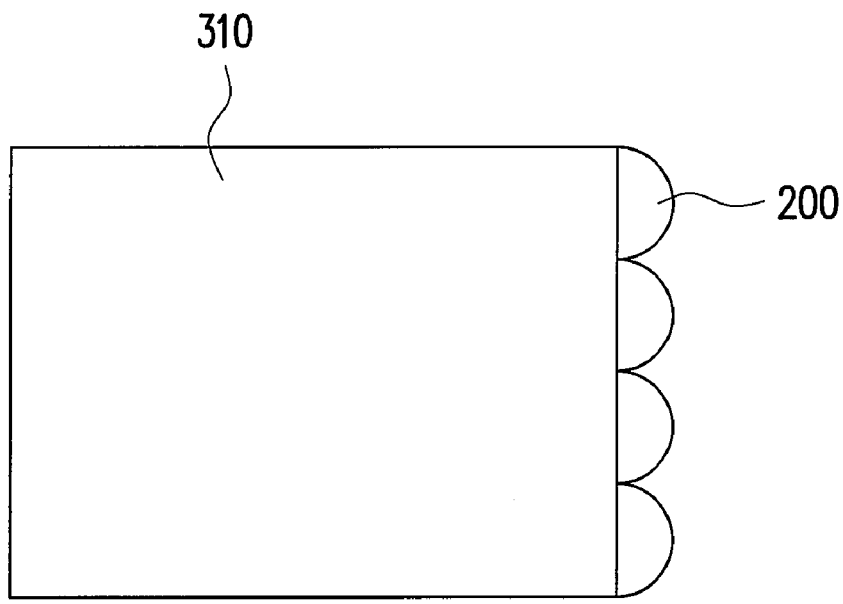
FIG. 5 is a schematic vertical view showing a surface light source device having the light emitting modules disposed at one side of the light guide plate of the present invention.
Figure 6:
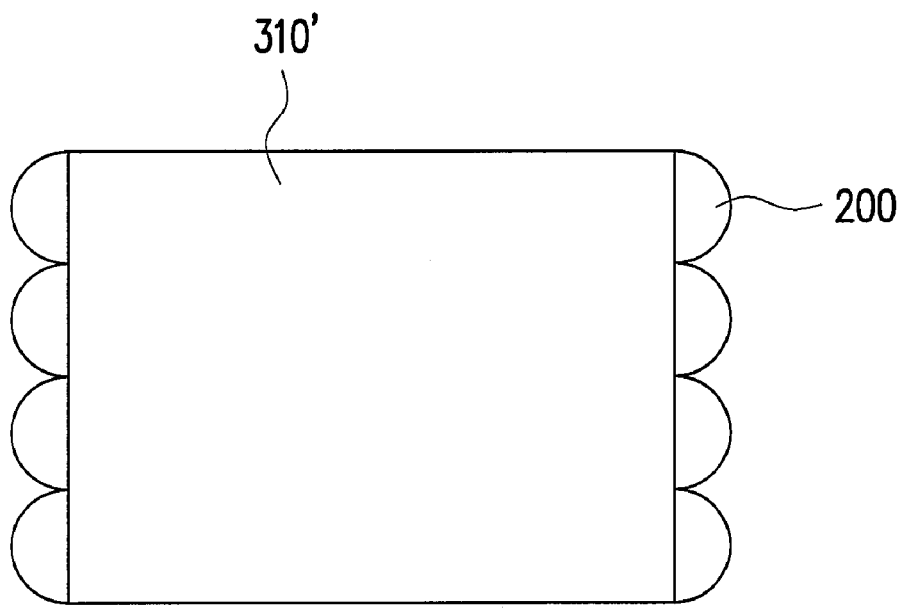
FIG. 6 is a schematic vertical view showing a surface light source device having the light emitting modules disposed at both sides of the light guide plate of the present invention.

A third embodiment is to apply the light emitting modules 200, 200' of the first embodiment and the second embodiment to a surface light source device. The surface light source device 300 comprises a light guide plate 310 and a plurality of light emitting modules 200. The light emitting modules 200 are disposed at one side of the light guide plate 310 (as shown in FIG. 5) or both sides of the light guide plate 310 (as shown in FIG. 6) The light beam 211 emerged from the light emergent surface of the light guide member 220 of each light emitting module 200 is incident into the light guide plate 310. The light guide plate 310 is suitable for transferring the light beams 211 into a surface light source with a uniform brightness. The light guide member 220 of each light emitting module 200 is separated or integrally formed, and the light guide member 220 and the light guide plate 310 of each light emitting module 200 are separated or integrally formed. When the light guide member 220 and the light guide plate 310 are integrally formed, the fabrication process of the surface light source device 300 can be simplified and the brightness loss of the light penetrating through the gap between the light guide plate 310 and the light guide member 220 can be reduced.

In summary, the light emitting module and the surface light source device of the present invention have at least the following advantages:

1. The light is well guided by the light guide member to reduce the occurrence of total internal reflections within the light guide member and make the light emerged from the light emergent surface have higher intensity, thus enhancing the light emitting efficiency of the light emitting module.

2. The light emitting module of the present invention employs a low-cost Lambertian LED package structure as the light source set, thus reducing the fabrication cost.

3. Since a plurality of LED chips are disposed on the carrier of a single light source set, the light beams emitted from these LED chips are mixed within the encapsulant and the light guide member, an additional space for mixing the light beams is not required, thus reducing the volume of the light emitting module.

4. The surface light source device of the present invention employs the light emitting module having higher light emitting efficiency, and therefore it provides a surface light source with higher brightness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light emitting module, comprising:
   a light source set, suitable for providing a light beam; and
   a light guide member, disposed above the light source set, the light guide member having a top surface, a light incident surface corresponding to the top surface, a first reflection surface, and a light emergent surface corresponding to the first reflection surface, the first reflection surface and the light emergent surface being connected between the top surface and the light incident surface, respectively, wherein the top surface has a first concave surface serving as a second reflection surface suitable for reflecting the light beam, a portion of the light beam reflected by the second reflection surface is reflected by the first reflection surface to emerge from the light emergent surface, and another portion of the light directly emerges from the light emergent surface.

2. The light emitting module according to claim 1, wherein the light source set comprises:
   a carrier;
   at least one light emitting diode chip, disposed on the carrier, the light emitting diode chip being suitable for providing the light beam; and
   an encapsulant, enclosing the light emitting diode chip.

3. The light emitting module according to claim 1, wherein the first concave surface is a tapered concave surface.

4. The light emitting module according to claim 1, wherein the light guide member further comprises a reflection film disposed on the first concave surface.

5. The light emitting module according to claim 1, wherein both ends of the first reflection surface are connected to both ends of the light emergent surface.

6. The light emitting module according to claim 1, wherein after the light emitted from the light source set is reflected by the second reflection surface, a portion of the light beam transmits along a direction substantially parallel to the light incident surface to emerge from the light emergent surface and the other portion of the light beam transmits to the first reflection surface, and then the light reflected by the first reflection surface transmits along a direction perpendicular to the light emergent surface of the light guide member and emerges the light emergent surface.

7. The light emitting module according to claim 1, wherein the light guide member further comprises a reflection film disposed on the first reflection surface.

8. The light emitting module according to claim 1, wherein the light guide member has a second concave surface disposed on the light incident surface opposite to the first concave surface, and the light source set is embedded in the second concave surface.

9. The light emitting module according to claim 1, wherein the second reflection surface and the first reflection surface are paraboloids.

10. A surface light source device, comprising:
    a light guide plate;
    a plurality of light emitting modules, disposed beside the light guide plate, wherein each light emitting module comprises:
    a light source set, suitable for providing a light beam; and
    a light guide member, disposed above the light source set, the light guide member having a top surface, a light incident surface corresponding to the top surface, a first reflection surface, and a light emergent surface corresponding to the first reflection surface, the first reflection surface and the light emergent surface being connected between the top surface and the light incident surface, respectively, wherein the top surface has a first concave surface having a second reflection surface suitable for reflecting the light beam, a portion of the light beam is reflected by the second reflection surface and the first reflection surface to emerge from the light emergent surface, the other portion of the light beam directly emerges from the light emergent surface, and the light beam emerging from the light emergent surface is incident into the light guide plate.

11. The surface light source device according to claim 10, wherein the light emitting modules are disposed at two opposite sides of the light guide plate.

12. The surface light source device according to claim 10, wherein each light source set comprises:
    a carrier;
    at least one light emitting diode chip, disposed on the carrier, the light emitting diode chip being suitable for providing the light beam; and
    an encapsulant, enclosing the light emitting diode chip.

13. The surface light source device according to claim 10, wherein the light guide members and the light guide plate are integrally formed.

14. The surface light source device according to claim 10, wherein the first concave surface is a tapered concave surface.

15. The surface light source device according to claim 10, wherein both ends of the first reflection surface of each light guide member are connected to both ends of the light emergent surface.

16. The surface light source device according to claim 10, wherein the light emergent surface of each light guide member has a second concave surface on the light incident surface opposite to the first concave surface, and the light source set is embedded in the second concave surface.

* * * * *